US008452768B2

(12) United States Patent
Shanbhag (10) Patent No.: US 8,452,768 B2
(45) Date of Patent: May 28, 2013

(54) USING USER SEARCH BEHAVIOR TO PLAN ONLINE ADVERTISING CAMPAIGNS

(75) Inventor: Amit Umesh Shanbhag, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 443 days.

(21) Appl. No.: 11/958,097

(22) Filed: Dec. 17, 2007

(65) Prior Publication Data

US 2009/0157676 A1 Jun. 18, 2009

(51) Int. Cl.
*G06F 17/00* (2006.01)

(52) U.S. Cl.
USPC .............................. 707/736; 707/759; 705/80

(58) Field of Classification Search
None
See application file for complete search history.

(56) References Cited

U.S. PATENT DOCUMENTS

| | | | |
|---|---|---|---|
| 6,519,580 B1* | 2/2003 | Johnson et al. | 706/47 |
| 2003/0139963 A1* | 7/2003 | Chickering et al. | 705/10 |
| 2005/0071325 A1* | 3/2005 | Bem | 707/3 |
| 2006/0149625 A1* | 7/2006 | Koningstein | 705/14 |
| 2006/0242013 A1* | 10/2006 | Agarwal et al. | 705/14 |
| 2007/0143266 A1* | 6/2007 | Tang et al. | 707/3 |
| 2007/0156621 A1* | 7/2007 | Wright et al. | 706/48 |

OTHER PUBLICATIONS

"RelatedKeywordRequestType", Yahoo! Inc. Available from: http://searchmarketing.yahoo.com/developer/docs/V2/reference/data/RelatedKeywordRequestType.php, downloaded on Nov. 26, 2007.

* cited by examiner

*Primary Examiner* — Yuk Ting Choi
(74) *Attorney, Agent, or Firm* — Weaver Austin Villeneuve & Sampson LLP (57) ABSTRACT

Targeting parameters are generated for a media buy plan for advertisements to be displayed in conjunction with presenting web pages, based on a history of search events. Key phrases are received relative to a subject of the advertisements to be displayed. The received key phrases are provided as proposed key phrases to determine, from search events indicative of historical data of uses of a search service, a first subportion of search events for queries of the search service with the proposed key phrases and a second subportion of search events for queries of the search service not with the proposed key phrases. Classification processing is applied to determine potential targeting parameters associated with the first subportion and with the second subportion to identify potential targeting parameters that, statistically, contribute to membership in the first sub-population and in the second sub-population, respectively. Statistics are associated with the potential targeting parameters, based on the historical data, indicative of factors usable to determine whether to use the potential targeting parameters as actual targeting parameters of the media buy plan.

33 Claims, 7 Drawing Sheets

| Cookie | Y! Sports PVS | Y! News PVS | Y! Mail PVS | Gender | Age | Zip code | State | Country | BT/Auctions | BT/Auto | . | Search |
|---|---|---|---|---|---|---|---|---|---|---|---|---|
| b1 | 89 | 12 | 12 | M | 12 | 94809 | CA | US | Y | Y | | Y |
| b2 | 1 | 1 | 3 | -1 | -1 | -1 | -1 | -1 | N | Y | | Y |
| . | | | | | | | | | | | | |
| b$_{N-1}$ | 1 | 12 | 1 | F | 34 | 78954 | AZ | US | Y | Y | | N |
| b$_N$ | 0 | 12 | 12 | M | 45 | 75063 | AZ | US | Y | Y | | N |

Network usage data 402 · Demographic data 404 · Behavioral data 406 · 408

USING USER SEARCH BEHAVIOR TO PLAN ONLINE ADVERTISING CAMPAIGNS

BACKGROUND

Online marketing, through targeted advertising, has become a popular method for advertisers to reach customers who may be particularly interested in the products/services offered by those advertisers. Generally, a media buy plan of a graphical(display) advertising "campaign" includes a designation of parameters to trigger display of the advertising of the campaign including, for example, characteristics of a user to whom the advertising is to be displayed and/or identification of web page domains on which the advertising is to be displayed.

An advertiser may work with a "sales planner" to determine what are thought to be appropriate targeting parameters such as user characteristics and web page domains to target for display advertisements to reach a desirable target audience. Such determination is typically made heuristically. However, this heuristic determination can be difficult, particularly in a "cold start" situation, in which the advertiser and any advisor (such as an advisor affiliated with the online service providing the marketing) may not have enough relevant experience to determine the targeting parameters heuristically.

Figure 1:
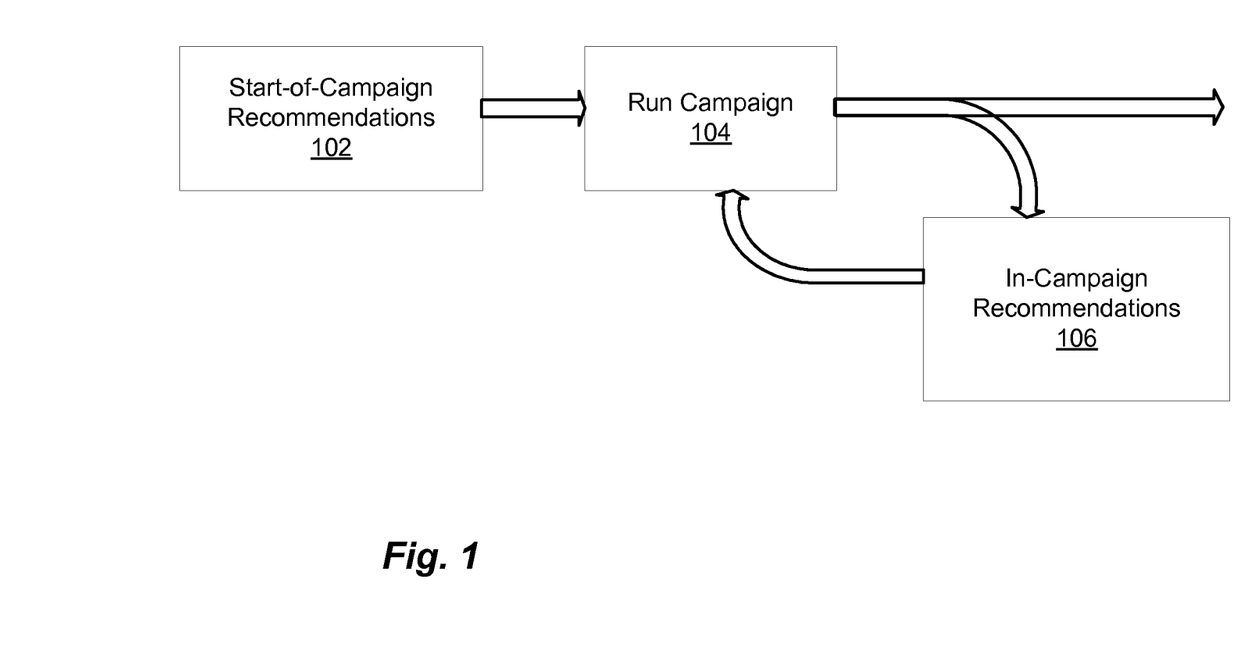
FIG. 1 is a flowchart that broadly illustrates a campaign flow.

For example, FIG. 1 is a flowchart that broadly illustrates a campaign flow. At 102, start-of-campaign recommendations are provided. This would typically be provided by a sales planner. At 104, the advertisement campaign is run. At 106, in-campaign recommendations may be provided.

SUMMARY

In accordance with an aspect, targeting parameters are generated for a media buy plan for advertisements to be displayed in conjunction with presenting web pages, based on a history of search events. Key phrases are received relative to a subject of the advertisements to be displayed. The received key phrases are provided as proposed key phrases to determine, from search events indicative of historical data of uses of a search service, a first subportion of search events for queries of the search service with the proposed key phrases and a second subportion of search events for queries of the search service not with the proposed key phrases. Classification processing is applied to determine potential targeting parameters associated with the first subportion and with the second subportion to identify potential targeting parameters that, statistically, contribute to membership in the first sub-population and in the second sub-population, respectively. Statistics are associated with the potential targeting parameters, based on the historical data, indicative of factors usable to determine whether to use the potential targeting parameters as actual targeting parameters of the media buy plan.

DETAILED DESCRIPTION

The inventor has realized that it can be useful, relative to developing a media buy plan for a display advertising campaign, to process and analyze characteristics associated with a history of events, some of which are search events using particular keywords deemed to be relevant to a product of the campaign, to infer recommendations of targeting parameters (which, generally, are not keyword-based or, at least, comprise parameters other than keyword-based parameters) regarding the campaign. In general, these inferred recommendations are directed to start-of-campaign recommendations, such as in 102 of FIG. 1 discussed in the Background.

Figure 2:
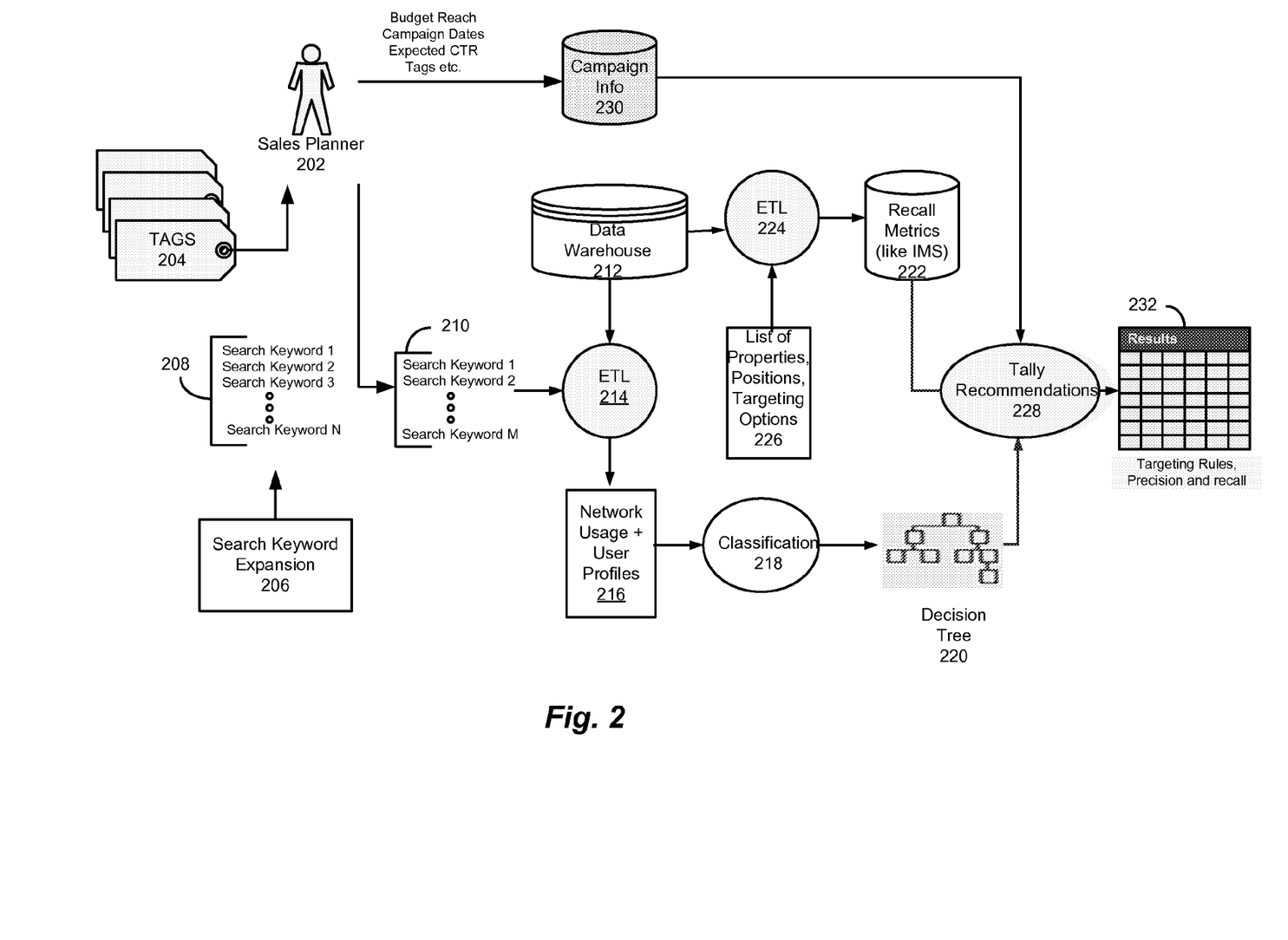
FIG. 2 schematically illustrates an architecture of a system in which parameters associated with previous searches for keywords corresponding to the product of the campaign may be processed and analyzed to infer recommendations regarding targeting parameters that may be appropriate to reach a desirable target audience.

FIG. 2 schematically illustrates an architecture of a system in which the characteristics associated with search events may be processed and analyzed to infer recommended targeting parameters regarding a campaign. Referring to FIG. 2, a sales planner 202 provides initial key phrases 204 have been determined (e.g., by the sales planner 202) to be good candidates for keywords that relate to the subject of the proposed advertising campaign. For example, if the subject of the proposed advertisement campaign is "Rogaine men's hair loss treatment," possible initial keywords may include "Rogaine," "men" and "hair loss."

Figure 3:
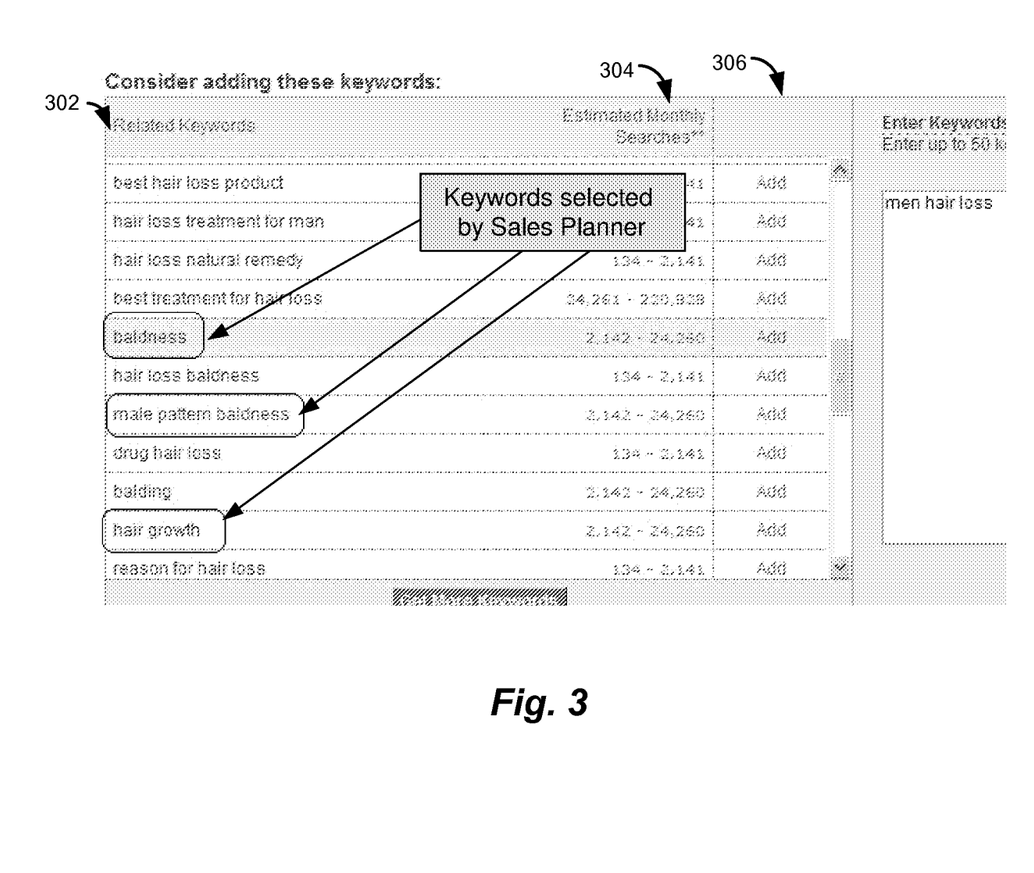
FIG. 3 illustrates an example of a portion of a result table that provides information on searching carried out with respect to various keywords relative to the product of the campaign.

The initial key phrases 204 are run through a search word expansion processing 206 to generate "N" search keywords 208 (in this context, "keywords" are not limited to a single word in the conventional sense of what is a "word") to evaluate. The search word expansion processing returns "similar" terms (e.g., processing to return words with the same root, synonyms, perhaps even words having the same root as the synonyms, and other processing). For example, see the discussion at http://searchmarketing.yahoo.com/dever/docs/V2/reference/data/RelatedKeywordRequestTyp.php which describes parameters to a RelatedKeywordRequestType object that is available from Yahoo via a web service API. The result is a table that includes the "N" search keywords. FIG. 3 illustrates an example of a portion of such a table. In the FIG. 3 example, a first column 302 includes the "N" search keywords. A second column 304 provides an estimate of the number of monthly searches for each of the "N" search keywords. A third column provides a user interface via which a sales planner 202 or other user may cause one of the "N" keywords to be added to a list of "M" keywords, which are presumably the search keywords the sales planner 202 deems to be most relevant to the product/service of the advertisement campaign.

Returning to FIG. 2, the system includes a data warehouse 212 that includes transaction records. As referred to by Yahoo!, and as used herein, the transaction records are known as "bcookies." An extraction processing 214 may be performed to retrieve a list of all bcookies that have transaction information relating to a search using any of the "M" search keywords 210 (denoted as being in the class of "Search=Y"). If the list of bcookies is large, sampling methodologies may be employed to reduce computation time to later process this reduced set of bcookies. The extraction processing 214 may also include processing to retrieve bcookies that have transaction information for searches not using any of the "M" search keywords 210 (denoted as being in the class of "Search=N").

Figure 4:
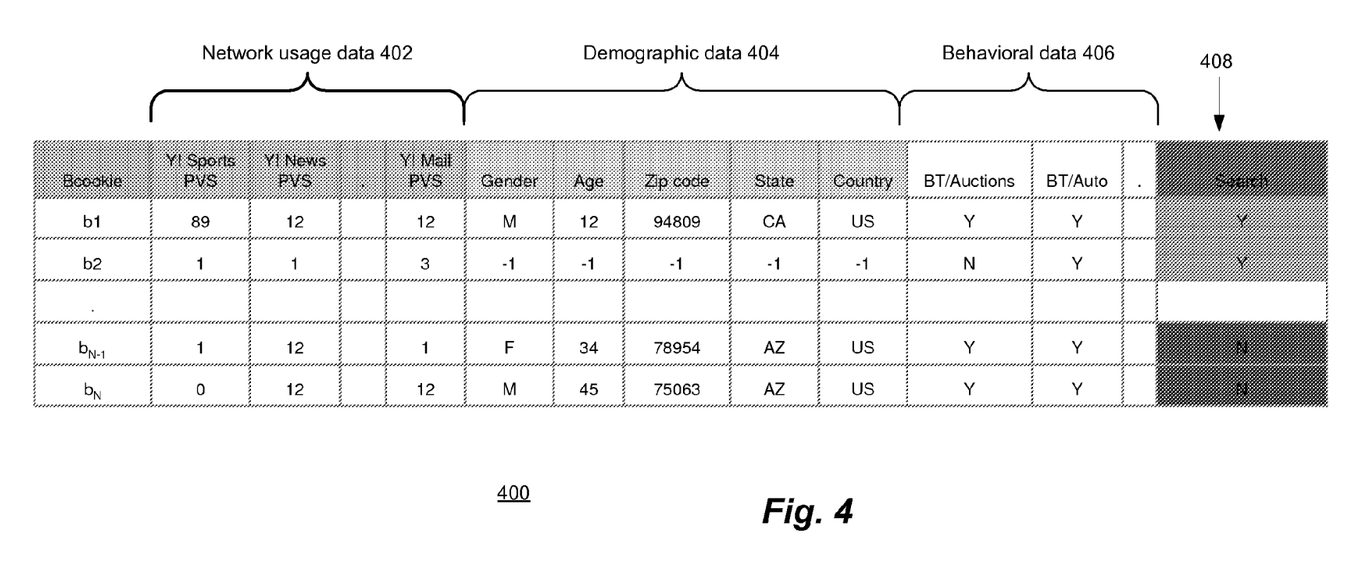
FIG. 4 illustrates an example table of network usage and user profiles for users, relative to various keywords.

Potential targeting parameters, which in this specific example includes network usage and user profiles 216, are retrieved from the data warehouse 212 for the retrieved bcookies so, in one example, a record is generated for each bcookie, including available network usage and user profile information. For example, FIG. 4 illustrates an example of a resultant table 400 of network usage and user profiles. The example table 400 includes columns corresponding to network usage data 402 (in the example, indicating number of page views for various Yahoo! properties); corresponding to demographic data 404 (in the example, corresponding to gender, age, ZIP code, etc.); and corresponding to behavioral data 406 (in the example, corresponding to whether the user is likely to be interested in buying cars denoted by "BT/Auto"). A column 408 indicates whether the user has searched on any of the "M" search keywords.

Returning again to FIG. 2, classification processing 218 may be performed on the information of the retrieved bcookies, to generate a decision tree 220. More particularly, the decision tree 220 is a decision tree representing factors that contribute to membership in the class of Search=Y relative to membership in the class of Search=N. Other classification representations may be utilized as well. A decision tree can be flattened out to yield targeting rules.

Figure 5:
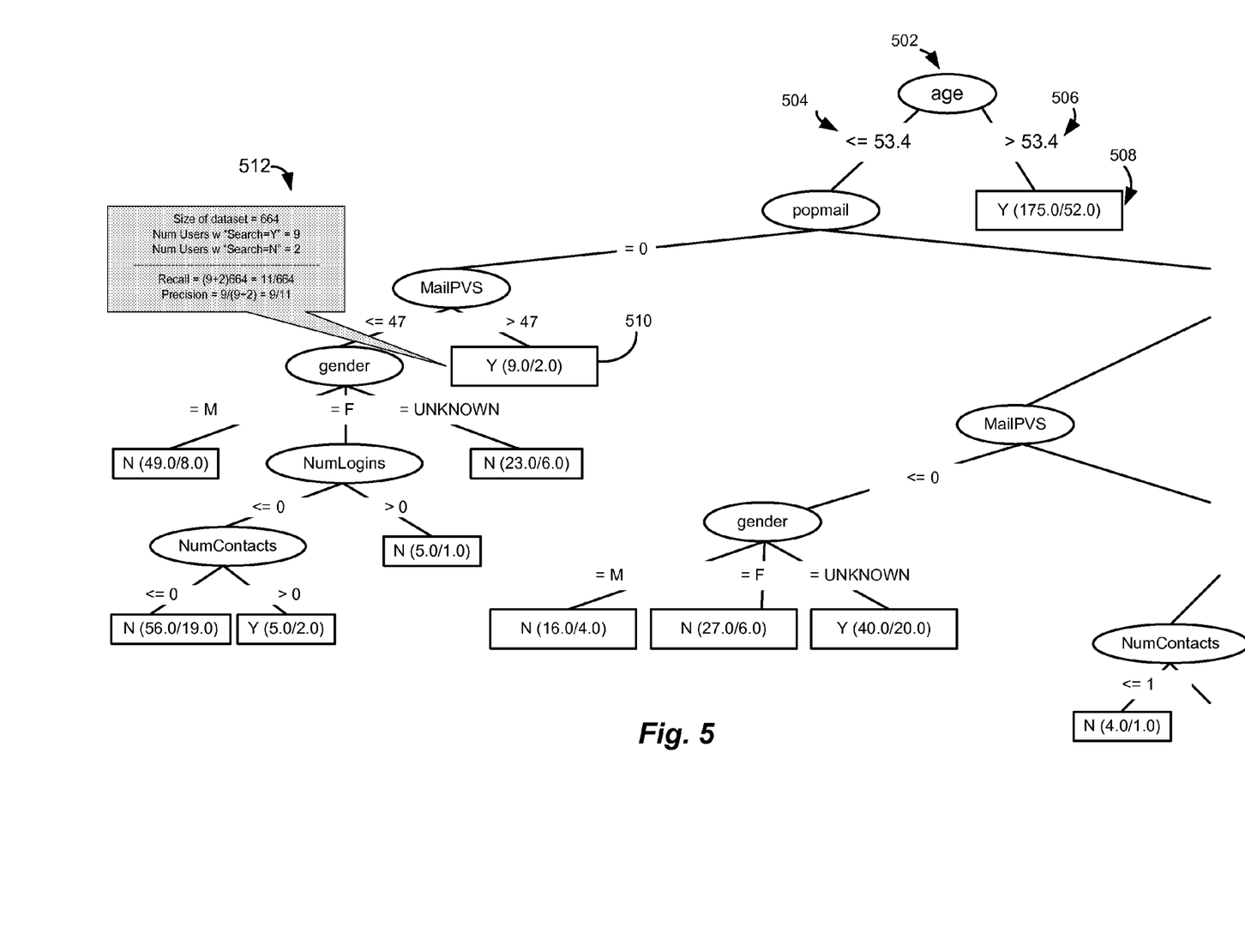
FIG. 5 illustrates an example decision tree resulting from classification processing of network usage and user profiles.

FIG. 5 illustrates an example decision tree. Each leaf node (i.e., a leaf node is a node of the decision tree that has no children nodes) has associated with it a precision and recall measurement or estimate, such as is mentioned above. Referring to the FIG. 5 example decision tree (portions of the decision tree 500 are not shown in FIG. 5), the decision represented by the root node 502 relates to age. In particular, the decision is for age less than or equal to 53.4 (for the left branch 504) and for age greater than 53.4 (for the right branch 506). FIG. 5 illustrates, for each leaf node of the decision tree 500, the number of users with "Search=Y" and the number of users with "Search=N." For example, the leaf node 508 indicates 175 users with "Search=Y" and 52 users with "Search=N."

Another leaf node of the decision tree 500 is leaf node 510. As shown in FIG. 5, the leaf node 510 is reached in the decision tree 500 by determining that a particular user is of age less than or equal to 53.4 (branch 504), is not a popmail user (branch 512) and has mail page views greater than 47 (branch 514). Referring specifically to leaf node 510, there are 9 users with "Search=Y" and 2 users with "Search=N." Furthermore, relative to the total size of the dataset (e.g., the number of records in the FIG. 4 table 400) for which the FIG. 5 decision tree has been generated, the associated precision and recall measurement or estimate may be viewed. With regard to the example leaf node 510, assuming a total size of the dataset on which classification is based being 664, the recall is determined to be 11/664 and the precision is determined to be 9/11. For example, for the various example leaf nodes, the statistics in the following Table 1 may be generated. (The first row corresponds to leaf node 510 in FIG. 5.)

TABLE 1

| Rule | CPM | Recall | Precision | Estimated Daily Inventory | Estimated relevant reach | Daily Spend | Relevant CPM |
|---|---|---|---|---|---|---|---|
| [age <= 53.4], [popmail = 0], [MailPVS = Y] | $1.00 | 1.60% | 81% | 16000 | 12960 | $16.00 | $1.23 |
| [age >= 53.4], [popmail = 1], [MailPVS = Y] | $1.20 | 10.60% | 21% | 106000 | 22260 | $127.20 | $5.71 |
| [age <= 53.4], [popmail = 0], [MailPVS = N] | $0.45 | 12.60% | 1% | 126000 | 1260 | $56.70 | $45.00 |

*Relevant CPM = the cost of showing 1000 impressions to actually targeted audience (this will increase relative to CPM as precision reduces)

In addition, statistics may be associated with the potential targeting parameters, based on the historical data, indicative of factors usable to determine whether to actually target an advertising campaign to those potential targeting parameters. For example, recall and precision metrics 222 may be estimated for each leaf node, based on data extracted using extraction processing 224 according to a list 226 of properties, positions and targeting options corresponding to the leaf nodes of the decision tree 220. Recall is an indication of the bcookies represented by a particular leaf node as a percentage of the total number of bcookies represented by the decision tree. Precision is an indication of the conciseness of the candidate set. That is, precision is an indication of how many bcookies represented by a particular leaf node are in the Search=Y class. Furthermore, the statistics may be indicative of expected cost of targeting with respect to the characteristics represented by a particular leaf node, based on factors such as an expected number of impressions, cost per impression, and available inventory.

Referring back to FIG. 2, the decision tree, recall metrics as well as campaign information 230 such as budget, reach, campaign date, expected click through rates, etc. are utilized in processing 228 to determine whether to recommend particular potential targeting parameters as actual targeting parameters. Results 232 are displayed as targeting rules for use in the start-of-campaign recommendations (such as start-of-campaign recommendations 102 in FIG. 1).

For example, referring to Table 1, for leaf node 510, the recall is 1.6% (which is 11/664) and the precision is 81% (which is 9/11). For the example, it is assumed that the cost of buying inventory of the type represented by node 510 is $1 per 1000 impressions (i.e., $0.001). Continuing with the example, it may be assumed that the total number of impressions expected in any one day for the properties represented by the decision tree is one million. This would result in an estimated number of impressions satisfying the conditions for leaf node 510 being equal to 1 million*1.6%, or about 16,000

(i.e., total impressions*recall). The total number of impressions in category "search=Y" would be expected to be 81% of 16,000, or about 12,960. So if the advertiser considered buying all of the inventory matching the targeting parameters corresponding to leaf node 510, it would cost about 16,000*$0.001, or $16 per day. Similar statistics are available for targeting parameters corresponding to each leaf node of the decision tree as shown, for example, in the second and third rows of Table 1.

Thus, the results 232 may include listings of various potential targeting parameters that, in view of the statistics associated with the targeting rules, correspond to the campaign information 230. The results 232 may further include information as to cost and expected impressions, for example, for the various targeting rules and/or combinations of targeting rules. Using the results 232, start-of-campaign recommendations may be provided.

Figure 6:
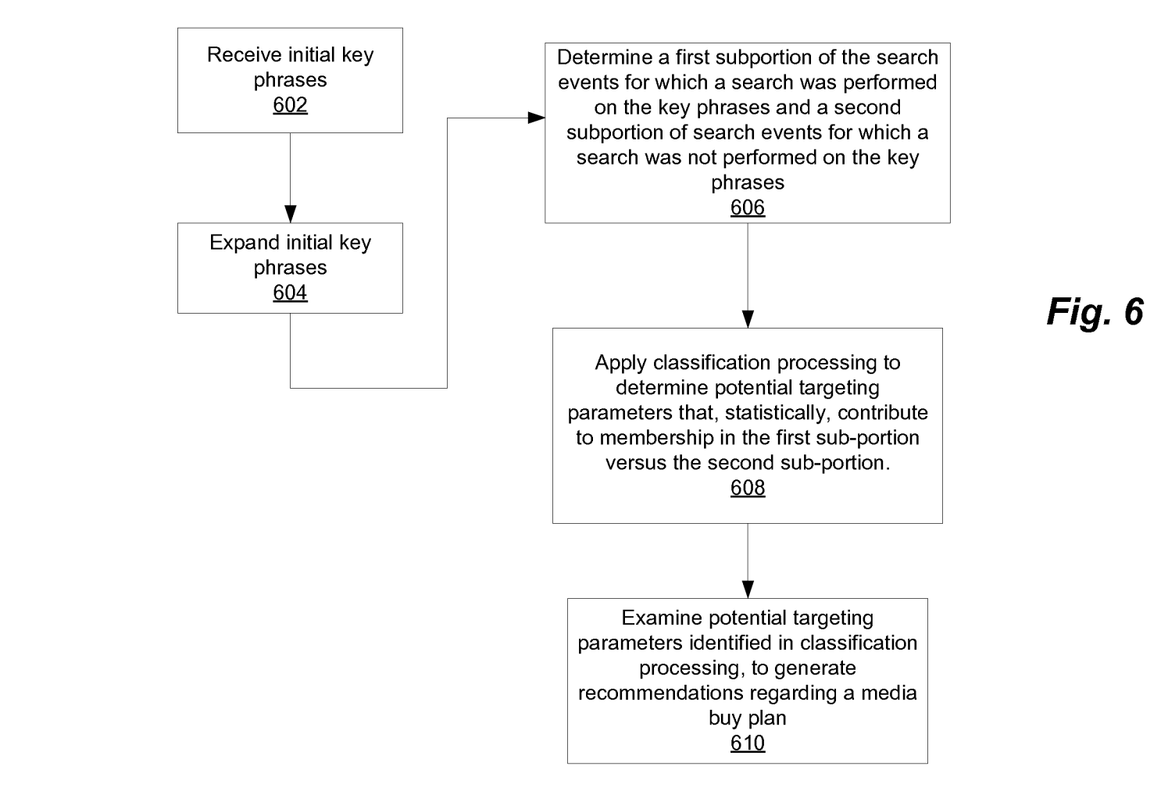
FIG. 6 is a flowchart illustrating an example of processing to develop start-of-campaign recommendations.

We now discuss, relative to the flowchart in FIG. 6, an example of processing to develop start-of-campaign recommendations in accordance with a broad aspect. At 602, initial key phrases are provided. At 604, which is an optional step, the initial key phrases are expanded. At 606, it is determined what sub-populations of users (e.g., by processing transactions records from a data warehouse) have searched on the key phrases and have not searched on the key phrases. At 608, classification processing is applied to identify potential targeting parameters relative to the subpopulations who have searched on the key phrases and who have not searched on the key phrases. At 610, potential targeting parameters identified in the classification processing are examined to generate recommendations of actual targeting parameters regarding a media buy plan.

Figure 7:
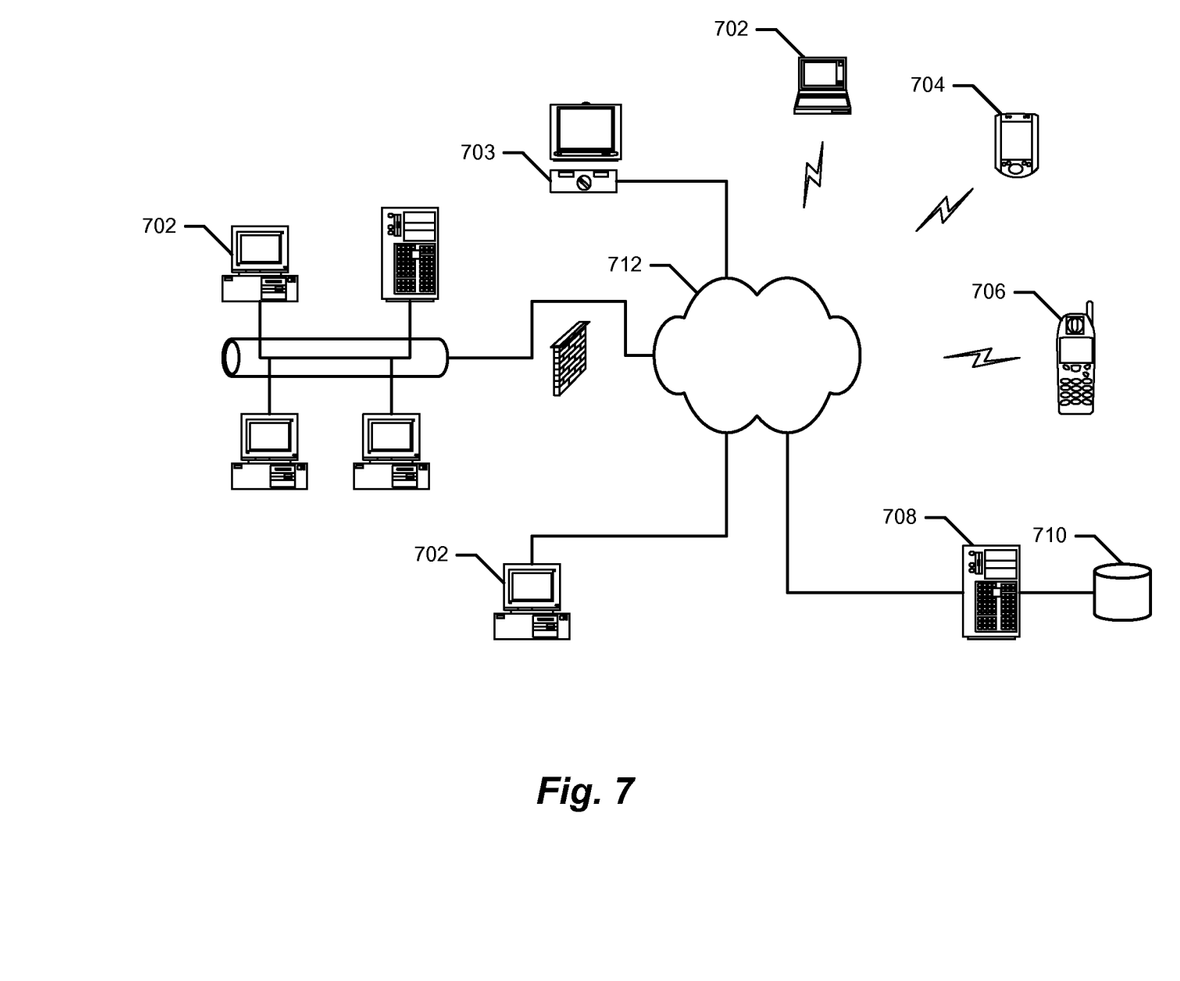
FIG. 7 is a simplified diagram of a network environment in which specific embodiments of the present invention may be implemented.

We have described a system/method to process and analyze characteristics associated with previous searches to infer recommendations regarding a media buy plan. Embodiments of the present invention may be employed to infer recommendations regarding a media buy plan in any of a wide variety of computing contexts. For example, as illustrated in FIG. 7, implementations are contemplated in which a diverse network environment may be employed, using any type of computer (e.g., desktop, laptop, tablet, etc.) 702, media computing platforms 703 (e.g., cable and satellite set top boxes and digital video recorders), handheld computing devices (e.g., PDAs) 704, cell phones 706, or any other type of computing or communication platform.

According to various embodiments, a method of determining the similarity class such as described herein may be implemented as a computer program product having a computer program embodied therein, suitable for execution locally, remotely or a combination of both. The remote aspect is illustrated in FIG. 7 by server 708 and data store 710 which, as will be understood, may correspond to multiple distributed devices and data stores.

The various aspects of the invention may also be practiced in a wide variety of network environments (represented by network 712) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

What is claimed is:

1. A method of generating targeting parameters of a media buy plan for an advertising campaign including one or more advertisements to be displayed in conjunction with presenting web pages, based on a history of search events, comprising:

receiving key phrases relative to a subject of the advertisements for which the targeting parameters of the media buy plan are to be generated;

providing the received key phrases as proposed key phrases to determine, from search events indicative of historical data of uses of a search service, a first subportion of search events for first queries of the search service that have been received from a first sub-population of users and a second subportion of search events for second queries of the search service that have been received from a second sub-population of users, the first queries including one or more of the proposed key phrases and the second queries not including one or more of the proposed key phrases;

applying classification processing to determine potential targeting parameters that, statistically, contribute to membership in the first sub-population of users that have submitted the first queries of the search service including one or more of the proposed key phrases and contribute to membership in the second sub-population of users that have submitted the second queries of the search service not including one or more of the proposed key phrases, wherein the potential targeting parameters include one or more user characteristics, the user characteristics including demographic data;

associating statistics with the potential targeting parameters, based on the historical data, indicative of factors usable to determine whether to use the potential targeting parameters as the targeting parameters of the media buy plan, wherein the targeting parameters include one or more characteristics of users to be targeted by the media buy plan; and generating recommendations regarding the media buy plan based, at least in part, upon the statistics associated with the potential targeting parameters, the recommendations indicating whether to use at least some of the potential targeting parameters as the targeting parameters of the media buy plan.

2. The method of claim 1, further comprising:

processing the received key phrases with a key phrase expansion processing to determine additional key phrases such that the proposed key phrases include the received key phrases and the additional key phrases.

3. The method of claim 1, wherein a result of the classification processing comprises a decision tree of the potential targeting parameters.

4. The method of claim 3, wherein the decision tree of the proposed targeting parameters comprises a plurality of nodes, each node corresponding to one or more of the potential targeting parameters, and the classification processing includes determining, for at least some of the nodes, statistics of the classification relative to the one or more of the potential targeting parameters to which that node corresponds.

5. The method of claim 4, wherein the classification processing comprises determining, for each at least some of the nodes, statistics regarding the one or more potential targeting parameters to which that node corresponds.

6. The method of claim 1, further comprising:

examining the potential targeting parameters determined in the classification processing, relative to the received key phrases, in view of costs associated with a media buy relative to those potential targeting parameters, to generate the recommendations regarding the media buy plan relative to at least some of the potential targeting parameters.

7. The method of claim 6, wherein:
examining the potential targeting parameters determined in the classification processing is further relative to a budget for the media buy plan.

8. The method of claim 1, wherein generating the statistics comprises generating recall and precision statistics based on the classification processing.

9. The method of claim 1, further comprising:
estimating a cost of using the potential targeting parameters based on expected impressions of the advertisements to be displayed.

10. The method of claim 9, wherein:
estimating the cost of using the potential targeting parameters is further based on estimated costs of the impressions.

11. The method of claim 1, wherein the potential targeting parameters do not include keyword-based parameters.

12. The method of claim 1, further comprising:
determining that the potential targeting parameters are to be used as the targeting parameters of the media buy plan based, at least in part, upon the statistics associated with the potential targeting parameters.

13. The method of claim 1, further comprising:
providing the advertisements according to the targeting parameters of the media buy plan.

14. The method of claim 13, wherein providing the advertisements according to the targeting parameters of the media buy plan comprises:
providing the advertisements to users having the characteristics specified in the targeting parameters.

15. The method of claim 1, wherein the statistics indicate an expected cost of using the potential targeting parameters as the targeting parameters.

16. The method of claim 15, wherein the statistics associated with the potential targeting parameters correspond to an expected number of impressions of the advertisements, cost per impression, and/or available inventory.

17. A computer program product for generating targeting parameters of a media buy plan for an advertising campaign including one or more advertisements to be displayed in conjunction with presenting web pages, based on a history of search events, the computer program product comprising at least one non-transitory computer-readable medium having computer program instructions stored therein which are operable to cause at least one computing device to:
obtain key phrases relative to a subject of the advertisements for which the targeting parameters of the media buy plan are to be generated;
provide the key phrases as proposed key phrases to determine, from search events indicative of historical data of uses of a search service, a first subportion of search events for first queries of the search service that have been received from a first sub-population of users and a second subportion of search events for second queries of the search service that have been received from a second sub-population of users, the first queries including one or more of the proposed key phrases and the second queries not including one or more of the proposed key phrases;
apply classification processing to determine potential targeting parameters that, statistically, contribute to membership in the first sub-population of users that have submitted the first queries of the search service including one or more of the proposed key phrases and contribute to membership in the second sub-population of users that have submitted the second queries of the search service not including one or more of the proposed key phrases, wherein the potential targeting parameters include one or more user characteristics, the user characteristics including demographic data;
associate statistics with the potential targeting parameters, based on the historical data, indicative of factors usable to determine whether to use the potential targeting parameters as the targeting parameters of the media buy plan, wherein the targeting parameters include one or more characteristics of users to be targeted by the media buy plan; and
generate recommendations regarding the media buy plan based, at least in part, upon the statistics associated with the potential targeting parameters, the recommendations indicating whether to use at least some of the potential targeting parameters as the targeting parameters of the media buy plan.

18. The computer program product of claim 17, wherein the computer program instructions further comprises computer program instructions operable to cause the at least one computing device to process the key phrases with a key phrase expansion processing to determine additional key phrases such that the proposed key phrases include the received key phrases and the additional key phrases.

19. The computer program product of claim 17, wherein a result of the classification processing comprises a decision tree of the potential targeting parameters.

20. The computer program product of claim 19, wherein the decision tree of the proposed targeting parameters comprises a plurality of nodes, each node corresponding to one or more of the potential targeting parameters, and the classification processing comprises determining, for at least some of the nodes, statistics of the classification relative to the one or more of the potential targeting parameters to which that node corresponds.

21. The computer program product of claim 17, wherein the classification processing program instructions comprise program instructions to, for each at least some of the nodes, generate statistics regarding the one or more potential targeting parameters to which that node corresponds.

22. The computer program product of claim 17, wherein the computer program instructions further comprise computer program instructions operable to cause the at least one computing device to examine the potential targeting parameters determined in the classification processing, relative to the key phrases, in view of costs associated with a media buy relative to those potential targeting parameters, to generate the recommendations regarding the media buy plan relative to at least some of the potential targeting parameters.

23. The computer program product of claim 22, wherein:
examining the potential targeting parameters determined in the classification processing is further relative to a budget for the media buy plan.

24. The computer program product of claim 17, wherein:
generating the statistics includes generating recall and precision statistics based on the classification processing.

25. The computer program product of claim 17, wherein the computer program instructions further comprise computer program instructions operable to cause the at least one computing device to estimate a cost of using the potential targeting parameters based on expected impressions of the advertisements to be displayed.

26. The computer program product of claim 25, wherein:
estimating the cost of using the potential targeting parameters is further based on estimated costs of the impressions.

27. A computing system configured to generate targeting parameters of a media buy plan for an advertising campaign including one or more advertisements to be displayed in conjunction with presenting web pages, based on a history of search events, comprising:
a processor;
a memory; and
computer-readable instructions configured to:
obtain key phrases relative to a subject of the advertisements for which the targeting parameters of the media buy plan are to be generated;
provide proposed key phrases including the key phrases to determine, from search events indicative of historical data of uses of a search service, a first subportion of search events for first queries of the search service that have been received from a first sub-population of users and a second subportion of search events for second queries of the search service that have been received from a second sub-population of users, the first queries including one or more of the proposed key phrases and the second queries not including one or more of the proposed key phrases;
apply classification processing to determine potential targeting parameters that, statistically, contribute to membership in the first sub-population of users that have submitted the first queries of the search service including one or more of the proposed key phrases and contribute to membership in the second sub-population of users that have submitted the second queries of the search service not including one or more of the proposed key phrases, wherein the potential targeting parameters include one or more user characteristics, the user characteristics including demographic data;
associate statistics with the potential targeting parameters, based on the historical data, indicative of factors usable to determine whether to use the potential targeting parameters as the targeting parameters of the media buy plan, wherein the targeting parameters include one or more characteristics of users to be targeted by the media buy plan; and
generate recommendations regarding the media buy plan based, at least in part, upon the statistics associated with the potential targeting parameters, the recommendations indicating whether to use at least some of the potential targeting parameters as the targeting parameters of the media buy plan.

28. The computing system of claim 27, wherein a result of the classification processing comprises a decision tree of the potential targeting parameters.

29. The computing system of claim 28, wherein the decision tree of the proposed targeting parameters comprises a plurality of nodes, each node corresponding to one or more of the potential targeting parameters, and the classification processing comprises determining, for at least some of the nodes, statistics of the classification relative to the one or more of the potential targeting parameters to which that node corresponds.

30. The computing system of claim 27, wherein: the classification processing comprises determining, for each at least some of the nodes, statistics regarding the one or more potential targeting parameters to which that node corresponds.

31. The computing system of claim 27, further comprising computer-readable instructions configured to:
examine the potential targeting parameters determined in the classification processing, relative to the initial key phrases, in view of costs associated with a media buy relative to those potential targeting parameters, to generate the recommendations regarding the media buy plan relative to at least some of the potential targeting parameters.

32. The computing system of claim 27, wherein the demographic data indicates gender, age, or zip code.

33. The computing system of claim 27, wherein the user characteristics further comprise behavioral data.

* * * * *